(12) United States Patent
Schindler et al.

(10) Patent No.: US 10,586,120 B2
(45) Date of Patent: Mar. 10, 2020

(54) METHOD AND APPARATUS FOR IDENTIFYING THE OPENING STATE OF A GARAGE DOOR

(71) Applicant: DAIMLER AG, Stuttgart (DE)

(72) Inventors: Philipp Schindler, Karlsruhe (DE); Markus Glaser, Schafhausen (DE)

(73) Assignee: DAIMLER AG, Stuttgart (DE)

( * ) Notice: Subject to any disclaimer, the term of this patent is extended or adjusted under 35 U.S.C. 154(b) by 0 days.

(21) Appl. No.: 16/328,078

(22) PCT Filed: Aug. 4, 2017

(86) PCT No.: PCT/EP2017/000949
§ 371 (c)(1),
(2) Date: Feb. 25, 2019

(87) PCT Pub. No.: WO2018/036646
PCT Pub. Date: Mar. 1, 2018

(65) Prior Publication Data
US 2019/0180124 A1 Jun. 13, 2019

(30) Foreign Application Priority Data
Aug. 26, 2016 (DE) ........................ 10 2016 010 373

(51) Int. Cl.
*G06K 9/00* (2006.01)
*G06K 9/62* (2006.01)
(Continued)

(52) U.S. Cl.
CPC ..... *G06K 9/00805* (2013.01); *G06K 9/00791* (2013.01); *G06K 9/6201* (2013.01);
(Continued)

(58) Field of Classification Search
CPC .......... E05Y 2900/531; E05Y 2400/44; E05Y 2900/132; E05Y 2201/716;
(Continued)

(56) References Cited

U.S. PATENT DOCUMENTS 6,285,778 B1 9/2001 Nakajima et al.
8,497,783 B2 7/2013 Leopold et al.
(Continued)

FOREIGN PATENT DOCUMENTS

CN 203094055 U 7/2013
CN 105222752 A 1/2016
(Continued)

OTHER PUBLICATIONS

International Search Report dated Nov. 8, 2017 in related/corresponding International Application No. PCT/EP2017/000949.
(Continued)

*Primary Examiner* — Michael P Stafira
(74) *Attorney, Agent, or Firm* — Patent Portfolio Builders PLLC

(57) ABSTRACT

A method and a device for detecting the opening state of a garage door or the like, such as a door that restricts entry by a vehicle are provided. A control apparatus generates a predetermined light pattern. A headlight apparatus projects the predetermined light pattern onto the door, while a camera apparatus detects the light pattern projected onto the door. The control apparatus compares the light pattern detected by the camera apparatus with the predetermined light pattern and outputs information signals according to the differences between the detected light pattern and the predetermined light pattern. The differences determine the opening state of the door.

10 Claims, 3 Drawing Sheets

(51) Int. Cl.
*B60K 35/00* (2006.01)
*B60W 30/06* (2006.01)

(52) U.S. Cl.
CPC .......... *B60K 35/00* (2013.01); *B60K 2370/16* (2019.05); *B60W 30/06* (2013.01); *B60W 2420/42* (2013.01)

(58) Field of Classification Search
CPC ......... E05Y 2400/322; E05Y 2400/326; E05Y 2400/354; E05Y 2400/80; E05Y 2600/46; E05Y 2800/24; E05Y 2900/31; E05Y 2900/546; G02B 6/0001; G06K 9/00288; G06K 9/00791; G06K 9/00845; G06K 9/00; G06K 9/00087; G06K 9/00362; G06K 9/00604; G06K 9/00664; G06K 9/00671; G06K 9/00832; G06K 9/00838; G06K 9/2027; G06K 9/4628; G06K 9/6274; G06K 9/628; G06K 9/66; G01B 11/14
See application file for complete search history.

(56) References Cited

U.S. PATENT DOCUMENTS

| | | | | |
|---|---|---|---|---|
| 2005/0140319 | A1* | 6/2005 | Takashima | E05F 15/73 318/286 |
| 2005/0207616 | A1* | 9/2005 | Brad | G01V 8/12 382/103 |
| 2010/0039217 | A1* | 2/2010 | Borlez | G08B 13/196 340/5.7 |
| 2010/0207724 | A1* | 8/2010 | Morii | B60R 25/00 340/5.71 |
| 2012/0050528 | A1* | 3/2012 | Davies | G01C 11/02 348/136 |
| 2012/0127317 | A1* | 5/2012 | Yantek | G01V 8/14 348/156 |
| 2012/0154583 | A1* | 6/2012 | Lundberg | G08B 7/06 348/143 |
| 2013/0138246 | A1* | 5/2013 | Gutmann | G05D 1/0231 700/253 |
| 2013/0243247 | A1 | 9/2013 | Sakaue et al. | |
| 2014/0118111 | A1 | 5/2014 | Saladin et al. | |
| 2015/0243115 | A1* | 8/2015 | Kagerer | E06B 9/68 340/5.71 |
| 2016/0034771 | A1* | 2/2016 | Schamp | G01B 11/2545 348/148 |
| 2018/0130168 | A1* | 5/2018 | Nayshtut | H04L 63/08 |
| 2018/0136364 | A1* | 5/2018 | Kare | G01S 17/026 |
| 2019/0352134 | A1* | 11/2019 | Tscuppert | B66B 13/02 |

FOREIGN PATENT DOCUMENTS

| | | |
|---|---|---|
| DE | 10336681 A1 | 3/2005 |
| DE | 102011119923 A1 | 5/2013 |
| DE | 102015224792 A1 | 6/2017 |
| EP | 1876829 A1 | 1/2008 |
| EP | 2306428 A1 | 4/2011 |

OTHER PUBLICATIONS

Examination Report dated Jun. 7, 2017 in related/corresponding DE Application No. 10 2016 010 373.6.
Written Opinion dated Nov. 8, 2017 in related/corresponding International Application No. PCT/EP2017/000949.

* cited by examiner

METHOD AND APPARATUS FOR IDENTIFYING THE OPENING STATE OF A GARAGE DOOR

BACKGROUND AND SUMMARY OF THE INVENTION

Exemplary embodiments of the invention relate to a method and a device for detecting the opening state of a garage door or the like, such as a door that restricts entry by a vehicle.

The opening state of garage doors cannot be reliably detected using the ultrasound sensors of parking systems that are installed in conventional vehicles, for example in cars. Although ultrasound sensors have a range of approximately 1 m in normal driving operation and a range of approximately 5-6 m at low speeds, as are common when parking, they only provide reliable feedback up to a height of approximately 50 cm due to their installation height in parking systems. In particular for automated parking, however, it is very important to determine whether a garage door is open wide enough for the vehicle to drive into the garage without being damaged.

Cameras which detect the road in front of the vehicle in driving operation and, for example, record the road markings or road signs are increasingly also being used in vehicles. These conventional cameras have difficulty correctly classifying the door, i.e., recognizing it as a garage door and recognizing the opening state thereof.

For example, radar sensors used for measuring the distance from the vehicle in front provide inaccurate results for garage doors due to reflections from the open space behind the door, or do not provide an echo of the radio waves emitted by the radar that can be definitively located.

A LiDAR, in which laser beams are used for optical distance measurement, usually does not provide a large enough opening angle, meaning that it likewise has significant limitations for detecting doors that open upwards.

Using conventional techniques, the opening state of garage doors that open upwards can only be unreliably determined. For example, it is also difficult to detect if a garage door has stopped halfway up and is thus preventing entry. Doors which slide sideways and are not solid may likewise provide an unreliable echo.

In this context, reference may also be made to US 2014/0118111 A1. This document describes an alarm system which alerts the person responsible to close the garage again if a door is unintentionally open. Here, various physical methods are described for identifying the open door. They are based, for example, on a change in the brightness and noise level when the door is open compared with when the door is closed, on an RFID chip on the door or on an image comparison of the stored image of the open door and the closed door. These methods require a complex apparatus and/or can only be used for the specific known door. Other principles measure the distance between the door and the parked vehicle using a laser or ultrasound. They are more flexible in relation to the door, but like the above-mentioned method involve the problem whereby they cannot detect a half-open door or non-solid doors, such as gates.

Systems with which the region in front of a vehicle can be illuminated by means of headlights are known from the prior art.

DE 10 2011 119923 A1 discloses an intelligent lighting system intended to act as a navigation and operating aid for vehicles. In this system, the dimensions and the radii of action of the vehicle and the components thereof are projected directly onto the road in addition to the normal illumination. This visualization of the vehicle width is intended to create a kind of warning system, which is also intended to be helpful for narrow thoroughfares, such as gateways and garage entrances. Once the boundary beams are visible on the entry boundary, for example the walls to the left and right of a garage door, this indicates a potential collision to the driver of the vehicle. However, this known lighting system does not make it possible to detect the opening state of a garage door, since the vehicle predominantly projects onto the ground in front of the vehicle. In addition, it is not possible to automatically detect the opening state using this system.

DE 10 2015 224 792 A1 discloses a method for operating a headlight of a motor vehicle comprising at least one actuatable and light-emitting headlight element. The headlight element of the headlight generates a light distribution that is monitored by a camera. The camera generates image data, by means of which an actual operating state of the headlight is determined. An existing functional limitation of the headlight is determined from the deduced actual operating state compared with an intended target operating state. The camera is integrated in the motor vehicle and is arranged behind the windscreen of the motor vehicle, and, for example, is integrated in a rearview mirror device. Using the known method, reduced functionality of a headlight element can be determined during the journey and appropriate measures can be taken. However, this known method does not make it possible to detect the opening state of a garage door, since only the headlight itself is monitored with regard to its functionality.

The two Chinese documents CN 105 222 752 A and CN 203 094 055 U describe methods in which unevenness in the surface of a road can be detected by means of a line pattern projected onto the road. This is advantageous in that a 3D image of the road surface can ultimately be produced using images taken by a 2D camera.

Reference can also be made to DE 103 36 681 A1 as additional prior art, which document describes a method for the targeted illumination of an object detected in the surroundings of a vehicle. A complex headlight is used for this purpose, which is capable of directing its light beam towards the object to be illuminated in a targeted manner.

The problem addressed by the present invention is that of providing a method and a device that make it possible to reliably detect the opening state of a garage door or the like, such as a door that restricts entry by a vehicle.

In the method, a predetermined light pattern is accordingly generated and projected onto the door. The light pattern projected onto the door is detected and compared with the predetermined light pattern. Information signals are generated according to the differences between the detected light pattern and the predetermined light pattern, the differences determining the opening state of the door. Using the method according to the invention, by projecting and observing light patterns on the door to be detected, it is possible to detect, in a simple manner, whether the door is closed, partially open or completely open. In this case, a predetermined pattern is compared with the pattern that is actually detected.

In order to identify partially open regions of the door, regions of the detected light pattern can be detected that have changed compared with the predetermined light pattern. In this case, parts of the predetermined light pattern in the at least partially open regions do not appear, do not completely appear, or appear distorted in the detected or observed light pattern, since here the predetermined light pattern is not projected onto part of the garage door.

In this case, the predetermined light pattern has an array of identical light objects that have the same geometry and surface area. This arrangement makes it possible to easily compare the predetermined light pattern with the detected light pattern, since differences are clearly visible.

The opening process of the door can also be detected by detecting the light pattern projected onto the door and comparing the detected light pattern with the predetermined light pattern continuously or repeatedly. A change in the number of detected light objects and the surface areas of the light objects is analyzed over time here.

In the device, a control apparatus is provided for generating a predetermined light pattern and a headlight apparatus is provided for projecting the predetermined light pattern onto the door. A camera apparatus detects or observes the light pattern projected onto the door. The control apparatus compares the light pattern detected by the camera apparatus with the predetermined light pattern and outputs information signals according to the differences between the detected light pattern and the predetermined light pattern, the differences determining the opening state of the door. Using the device according to the invention, by projecting and observing light patterns on the door to be detected and on the space therebehind, it is possible to detect, in a simple manner, whether the door is closed, partially open or completely open. In this case, a predetermined pattern is compared with the pattern that is actually detected.

According to a preferred embodiment, the headlight apparatus may comprise at least one projection-enabled headlight in the form of a grid-like light source or the like equipped with LED chips that can be individually actuated by the control apparatus. A headlight of this type is also known as a multibeam LED headlight, which can project a focused light pattern onto a surface, for example a garage door. What are known as laser headlights can also be used. This light pattern can be easily detected by the camera apparatus and can be easily processed in the control apparatus, meaning that the distance from the projection surface can be reliably determined.

In a further embodiment, the headlight apparatus may comprise infrared diodes (IR diodes) and the light pattern may be projected in the infrared wavelength range. IR light is invisible to the human eye, and therefore the opening state of the door can be detected without being noticed by observers, and also nobody is dazzled unnecessarily. Alternatively, what is known as a time of flight (TOF) measurement is, for example, also possible using a TOF camera, in which a propagation time technique is carried out by means of laser scanning, similarly to a Flash LiDAR.

A display apparatus may be provided inside the vehicle on which the opening state of the door is displayed to the driver of the vehicle based on the information signals generated by the control apparatus. This may be acoustic and/or graphic. Here, the display device assists the driver when parking in the garage and/or when driving through the door.

In another, advantageous embodiment, the control apparatus may be connected to a fully or partially automatic parking system of the vehicle. Based on the information signals generated by the control apparatus, the opening state of the door may be used for controlling the process of parking the vehicle. For example, by means of what is known as a remote parking pilot, a vehicle equipped with ultrasound parking sensors can be parked remotely using a smartphone. For this remote parking in a garage, it is important that the system takes into account the opening state of the garage door.

BRIEF DESCRIPTION OF THE DRAWING FIGURES

Further advantageous embodiments of the method and the device according to the invention become clear on the basis of an embodiment that is described in greater detail with reference to the drawings, in which.

DETAILED DESCRIPTION

Figure 1:
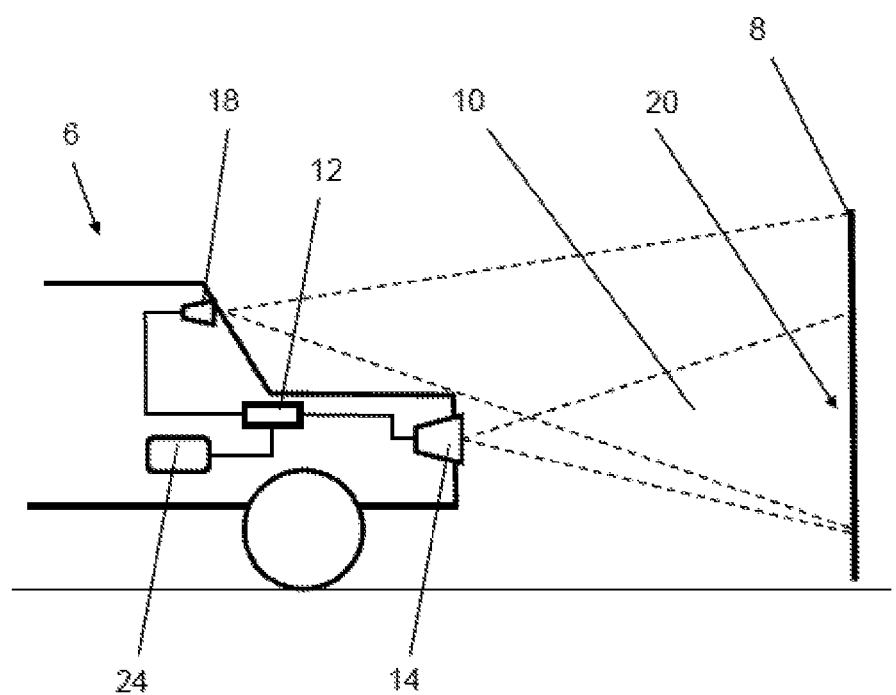
FIG. 1 is a schematic side view of a vehicle that is positioned in front of a garage door and is equipped with a device for detecting the opening state of the garage door according to an embodiment of the invention.

FIG. 1 is a schematic side view of a vehicle 6 that is positioned in front of a garage door 8 and is equipped with a device (described in greater detail in the following) for detecting the opening state of the garage door according to an embodiment of the invention.

A headlight apparatus 14 of the vehicle 6 projects a predetermined light pattern, schematically shown in FIG. 1 by the beam of light having reference sign 10, onto the door 8 of a garage (not shown in greater detail). The door 8 is closed. The predetermined light pattern 10 is completely projected onto the closed door 8 and generates a projected light pattern 20.

The predetermined light pattern 10 is generated by a control apparatus 12 that is connected to the headlight apparatus 14 by means of a vehicle bus and is built into the vehicle 6. The control apparatus 12 is a computer on board the vehicle having corresponding graphics properties.

A camera apparatus 18 connected to the vehicle bus is arranged behind the windshield in the region of the rearview mirror device of the vehicle 6 and detects or records the light pattern 20 projected onto the door 8.

The control apparatus 12 compares the light pattern 20 detected by the camera apparatus 18 with the predetermined light pattern 10. Since the door 8 is closed, the camera records the entire projected light pattern 20, which corresponds to the predetermined light pattern 10. Based on this comparison result, the control apparatus 12 generates a corresponding information signal with the value "Door closed". This information is displayed to the driver of the vehicle 6 on a display apparatus 24 that is connected to the vehicle bus and is positioned inside the vehicle 6. The display apparatus 24 is the screen of a driver information system built into the vehicle 6.

According to an alternative embodiment (not shown), the control apparatus 12 may be connected to a fully or partially automatic parking system of the vehicle 6. The information signals regarding the opening state of the door 8 can then be used for controlling the process of parking the vehicle 6.

Figure 2:
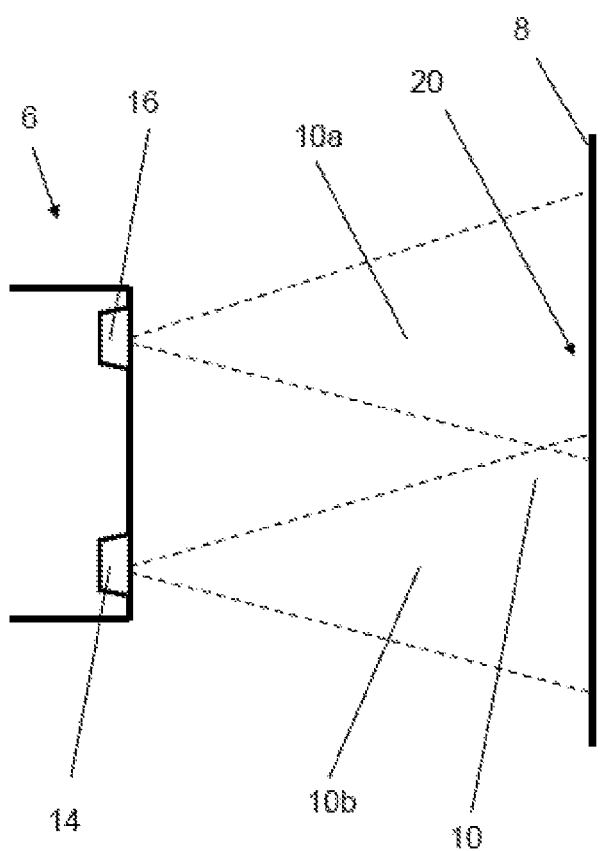
FIG. 2 is a schematic plan view of the vehicle that is positioned in front of the garage door and shown in FIG. 1.

FIG. 2 is a schematic plan view of the vehicle 6 that is positioned in front of the garage door 8 and shown in FIG. 1.

The headlight apparatus comprises two LED headlights 14 and 16 of a MULTIBEAM LED lighting system. The LED headlights 14 and 16 of the MULTIBEAM LED lighting system each comprise a very rapidly reacting precision illumination module in the form of a grid-like light source, which is equipped with 24 individual high-power LED chips. Each of these LED chips can be actuated by the control apparatus 12 electronically and independently of the others. Therefore, the control apparatus 12 controls the LED chips of the headlights 14 and 16 according to the predetermined light pattern 10. The headlight 14 on the right-hand side in the travel direction of the vehicle 6 generates a predetermined partial light pattern 10a and the headlight 16 on the left-hand side in the travel direction of the vehicle 6 generates a predetermined partial light pattern 10b. Overlaying the two partial light patterns 10a and 10b produces the predetermined light pattern 10 that is projected onto the garage door 8, which is closed in FIGS. 1 and 2, and generates the projected light pattern 20 thereon.

According to an alternative embodiment (not shown), just one of the headlights 14 or 16 can be used for projecting the light pattern 20. The predetermined light pattern 10 is then not generated by two partial light patterns.

According to another alternative embodiment (not shown), the headlights 14 and 16 may comprise infrared diodes (IR diodes) that project the light pattern in the infrared wavelength range.

According to another alternative embodiment (not shown), the light pattern may be projected onto the garage door by an additional light source, for example a third searchlight or a separate laser scanner.

Figure 3:
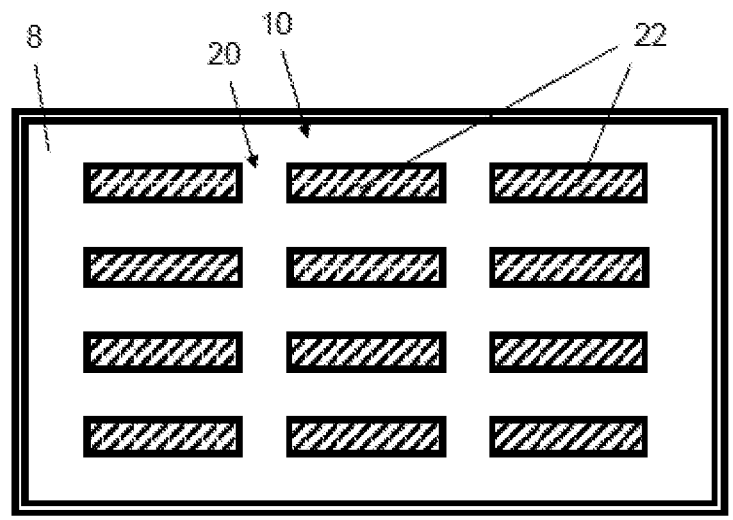
FIG. 3 is a schematic front view of the garage door shown in FIGS. 1 and 2 when completely closed, with a predetermined light pattern being projected onto the garage door.

FIG. 3 is a schematic front view of the garage door 8 shown in FIGS. 1 and 2 when completely closed, with the predetermined light pattern 10 being projected onto the garage door 8.

The predetermined light pattern 10 generated by the control apparatus 12 consists of an array of twelve identical, rectangular light objects 22 having the same surface area. The rectangles are arranged in columns and rows in accordance with the array. The headlights 14 and 16 project the predetermined light pattern 10 onto the closed garage door. The light pattern 20 projected onto the closed garage door 8 corresponds to the predetermined light pattern 10.

The camera apparatus 18 detects the light pattern 20. The control apparatus 12 compares the light pattern 20 detected by the camera apparatus 18, in particular the distribution, number and surface areas of the rectangular light objects 22, with those of the predetermined light pattern 10. Since the door 8 is closed in FIG. 3, the camera records the entire projected light pattern 20. The distribution, number and surface areas of the rectangular light objects 22 of the projected light pattern 20 corresponds to the distribution, number and surface areas of the rectangular light objects 22 of the predetermined light pattern 10.

On the basis of this comparison result, the control apparatus 12 generates the information signal with the value "Door closed", which is displayed to the driver of the vehicle 6 on the display apparatus 24.

Figure 4:
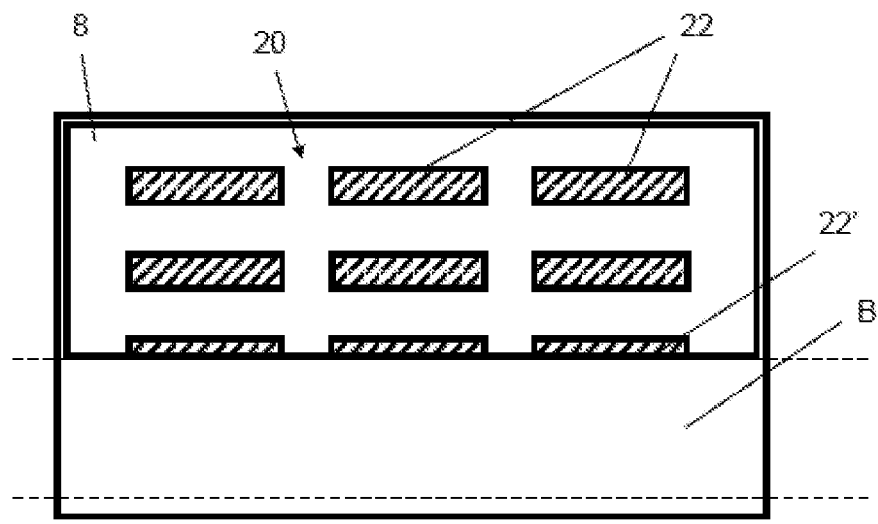
FIG. 4 is a schematic front view of the garage door shown in FIGS. 1 to 3 when partially open, having a light pattern that has changed compared with the predetermined light pattern.

FIG. 4 is a schematic front view of the garage door 8 shown in FIGS. 1 to 3 when partially open, having a light pattern 20 that has changed compared with the predetermined light pattern 10.

The headlights 14 and 16 project the predetermined light pattern 10 onto the partially open garage door 8. The light pattern 20 projected onto the partially open garage door 8 does not correspond to the predetermined light pattern 10. Instead, there are differences in the open region B of the garage door when comparing the two light patterns 10 and 20.

The camera apparatus 18 detects the light pattern 20 projected onto the partially open garage door 8. The control apparatus 12 compares the light pattern 20 detected by the camera apparatus 18, in particular with regard to the distribution, number and surface areas of the rectangular light objects 22 of the two light patterns 10 and 20.

Since the door 8 is partially open in FIG. 4, the camera records an entire light pattern 20 projected onto the garage door 8 that differs from the predetermined light pattern 10 radiated by the headlights 14 and 16. The distribution, number and surface areas of the rectangular light objects 22 of the projected light pattern 20 does not correspond to the distribution, number and surface areas of the rectangular light objects 22 of the predetermined light pattern 10. Instead, only nine of the original twelve rectangular light objects 22 are visible in the upper part of the projected light pattern 20. The lower part, which is formed by the region B in FIG. 4, does not comprise any light objects. Instead, the three light objects 22' arranged in a row in the bottom part of the garage door closest to the open region B are partially cut off, and thus have a reduced surface area that differs from the predetermined light pattern 10.

Based on this comparison result, the control apparatus 12 generates the information signal with the value "Door partially open", and, using the measurement of the region B, how far the garage door 8 is open can also be specified. This information is displayed to the driver of the vehicle 6 on the display apparatus 24.

For a garage door that is completely open (not shown), the camera apparatus 18 together with the control apparatus 12 does not detect any light objects 22 in the projected light pattern 20. Based on this comparison result, the control apparatus 12 generates the information signal with the value "Door completely open". This information is displayed to the driver of the vehicle 6 on the display apparatus 24.

The light pattern 20 projected onto the door 8 is detected and the detected light pattern 20 is compared with the predetermined light pattern 10 continuously or at timed intervals, as a result of which an opening process of the door 8 is detected. A change in the number of detected light objects 22 and the surface areas of the light objects 22' is continuously analyzed and displayed to the driver.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for detecting the opening state of a door that restricts entry by a vehicle, the method comprising:
generating a predetermined light pattern having an array of identical light objects with a common geometry and surface area, wherein the array of identical light objects includes the identical light objects being arranged in columns and rows and each of the identical light objects of the array of identical light objects are spaced apart from adjacent identical light objects in both the columns and rows of the array of identical light objects so that no light is generated between adjacent identical light objects of the array of identical light objects;
projecting the predetermined light pattern onto the door;
detecting the light pattern projected onto the door;
comparing the detected light pattern with the predetermined light pattern to determine whether the door is open or closed; and
generating information signals corresponding to an opening state of the door according to differences between the detected light pattern and the predetermined light pattern identified in the comparison.

2. The method of claim 1, wherein comparing the detected light pattern with the predetermined light pattern comprises:
detecting regions of the detected light pattern that have changed compared with the predetermined light pattern, the detected regions being identified as at least partially open regions of the door.

3. The method of claim 1, wherein detecting the light pattern projected onto the door and comparing the detected light pattern with the predetermined light pattern takes place continuously or repeatedly, as a result of which an opening process of the door is detected by analyzing a change in a number of detected light objects of the detected light pattern, surface areas of the detected light objects of the detected light pattern, or a contour of the detected light objects of the detected light pattern.

4. A device for detecting the opening state of a door that restricts entry by a vehicle, the device comprising:
a controller configured to generate a predetermined light pattern having an array of identical light objects with a common geometry and surface area, wherein the array of identical light objects includes the identical light objects being arranged in columns and rows and each of the identical light objects of the array of identical light objects are spaced apart from adjacent identical light objects in the columns and rows of the array of identical light objects so no light is generated between adjacent identical light objects of the array of identical light objects;
a headlight configured to project the predetermined light pattern onto the door; and
a camera configured to detect the light pattern projected onto the door,
wherein the controller is configured to compare the light pattern detected by the camera with the predetermined light pattern and output information signals corresponding to an opening state of the door according to differences between the detected light pattern and the predetermined light pattern.

5. The device of claim 4, wherein the headlight comprises at least one a grid light source with LED chips that can be individually actuated by the controller.

6. The device of claim 4, wherein the headlight comprises infrared diodes and the light pattern is projected in an infrared wavelength range.

7. The device of claim 4, further comprising:
a display arranged inside the vehicle and configured to display the opening state of the door based on the information signals.

8. The device of claim 4, wherein the controller is connected to a fully or partially automatic parking system of the vehicle and the opening state of the door is used for controlling the process of parking the vehicle based on the information signals.

9. The method of claim 1, wherein, responsive to the comparison of the detected light pattern with the predetermined light pattern indicating that at least a portion of at least one of the identical light objects is not present in the detected light pattern, the generated information signals indicate that the door is at least partially open.

10. The device of claim 4, wherein the controller, responsive to the comparison of the detected light pattern with the predetermined light pattern indicating that at least a portion of at least one of the identical light objects is not present in the detected light pattern, determines that the door is at least partially open.

* * * * *